United States Patent [19]

Crumb et al.

[11] Patent Number: 4,995,676
[45] Date of Patent: Feb. 26, 1991

[54] POSITIONING RING FOR A HYDRAULICALLY OPERATED WARNING DEVICE

[75] Inventors: Donald A. Crumb, Granger, Ind.; Richard A. Zander, Niles, Mich.; Robert F. Gaiser, Stevensville, Mich.

[73] Assignee: Allied-Signal Inc., Morristown, N.J.

[21] Appl. No.: 450,359

[22] Filed: Dec. 8, 1989

[51] Int. Cl.⁵ .............................................. B60T 13/00
[52] U.S. Cl. .................................. 303/9.63; 303/9.75
[58] Field of Search ............ 303/9.62, 9.63, 9.71–9.75

[56] References Cited

U.S. PATENT DOCUMENTS

| 3,672,728 | 6/1972 | Keady et al. | 303/9.63 |
| 4,208,074 | 6/1980 | Ishigami | 303/9.63 |
| 4,331,363 | 5/1982 | Berisch | 303/9.63 X |
| 4,929,033 | 5/1990 | Zander et al. | 303/9.63 |

Primary Examiner—Robert P. Olszewski
Assistant Examiner—Alfred Muratori
Attorney, Agent, or Firm—Larry J. Palguta; Ken C. Decker

[57] ABSTRACT

The positioning ring (44) for a hydraulically operated warning device (80) may be utilized for any hydraulically movable piston or sleeve (52) which, when properly assembled, causes a warning device (80) to effect an initial mode of response. The positioning ring (44) has a reduced inner diameter portion (41) separated from an enlarged inner diameter portion (43) by way of a radial shoulder (42). The enlarged inner diameter portion (43) abuts a shoulder (17) of a surrounding housing (11) and the radial shoulder (42) abuts a shoulder (59) of the piston or sleeve (52). The housing (11) may contain a warning device (80) which engages the piston or sleeve (52) such that if the piston or sleeve (52) is displaced in an axial direction the warning device (80) is operated. Should the centering ring (44) be mis-assembled or not included in the assembly, either the misassembled positioning ring (44) or the lack of the positioning ring (44) permits the piston or sleeve (52) to be moved to a position where the warning device (80) is operated to provide an indication that the positioning ring (44) is either misassembled or missing from the assembly.

15 Claims, 4 Drawing Sheets

POSITIONING RING FOR A HYDRAULICALLY OPERATED WARNING DEVICE

BACKGROUND OF THE INVENTION

The present invention relates to a positioning ring for a hydraulically operated warning device, in particular a positioning ring for a combination proportioning valve and warning switch assembly.

Automatic vehicle proportioning valves typically utilize a differential area piston or sleeve in the secondary brake circuit so that when a predetermined pressure level is reached, the piston or sleeve shifts in the direction of the smaller area piston end. As the piston shifts, the piston approaches a poppet or seal and this establishes a pressure restriction. Upon a further increase in secondary pressure communicated to the proportioning valve piston or sleeve, the outlet pressure will rise at a rate determined by the differential areas at the ends of the piston. Copending U.S. patent application No. 266,964 now U.S. Pat. No. 4,929,033 entitled "Primary and Secondary Pressure-Balanced Proportioning Valve", incorporated by reference herein, discloses a two-part piston assembly wherein one piston part includes an extension received within an interior bore of the other piston or sleeve part. The other piston or sleeve part includes a recess thereabout which is engaged by the probe of a warning switch. Should there exist a failure of pressure in either the secondary or primary pressure chambers of the associated master cylinder, the other piston or sleeve part will be displaced and cause the probe part to be retracted so that a pressure failure warning is provided to the vehicle operator. U.S. Pat. No. 4,929,033 illustrates such an assembly wherein the other piston or sleeve part includes thereabout a square-shaped centering ring which abuts a radial shoulder of the other piston part and a seal abuts the ring. Forces acting upon the seal, ring, and sleeve part as a result of pressure in the secondary chamber tend to be greater than the counteracting forces acting upon the opposite end of the other piston or sleeve part and generated by pressure in the primary chamber. This permits the other piston or sleeve to be moved axially until the ring engages a radial portion or shoulder of the housing which extends into the bore. Currently produced pressure differential switches utilize a timed pressure-leakage method in order to detect a missing or reversed centering ring/sealing ring installation. In other words, if the seal or centering ring are misassembled or missing from the assembly, this is detected by a pressure-leakage method. This pressure-leakage method utilizes an undercut in the other piston or sleeve part which generally permits leakage past the seal if incorrect installation occurs. Although testing has indicated that the other piston part or sleeve does cause the detection of a missing or reversed seal or centering ring by means of the pressure-leakage method, it is theoretically possible that detection may not occur due to the possible occurrence of the sealing ring sealing or seating at the aligned sleeve/housing body interface. In order to prevent a possible failure to detect either the misassembly or inclusion of the seal and centering ring, it is desirable to provide a centering ring which if missing or misassembled would cause movement of the other piston or sleeve part so that the warning switch is activated and an electrical signal from the actuated warning switch provides the desired detection, rather than utilizing the measured time/leakage method. This would provide an improved method of fault detection which better assures that correct assembly of the porportioning valve/warning switch combination has been accomplished.

SUMMARY OF THE INVENTION

The present invention provides a solution to the above problems by providing a positioning ring for a hydraulically operated device, the hydraulically operated device comprising a housing having therein a bore communicating with an opening having therein a hydraulically responsive device, pressure movable sleeve means disposed within said bore and having a positioned sleeve portion thereat, the hydraulically responsive device including movable means responsive to the positioned sleeve portion, the sleeve means defining at one end of said bore a portion of a first pressure chamber and at the other end of the bore a portion of a second pressure chamber, the bore including a housing shoulder and the sleeve means including a sleeve shoulder, and stepped positioning ring means disposed about said sleeve means, the stepped positioning ring means engaging the sleeve shoulder and housing shoulder so that the shoulders are nonaligned relative to one another, pressure within the secondary chamber exerted upon the sleeve means and ring means in a direction toward the first chamber so that said stepped positioning ring means engages said housing shoulder, such that one of a mis-assembly of said stepped positioning ring means and a failure to place said stepped positioning ring means about said sleeve means permits said sleeve means to be displaced toward said first pressure chamber to cause the movable means to respond to the displacement of the positioned sleeve portion.

One way of carrying out the invention is described in detail below with reference to the drawings which illustrate an embodiment in which:

DETAILED DESCRIPTION OF THE PREFERRED EMBODIMENT

Figure 1:
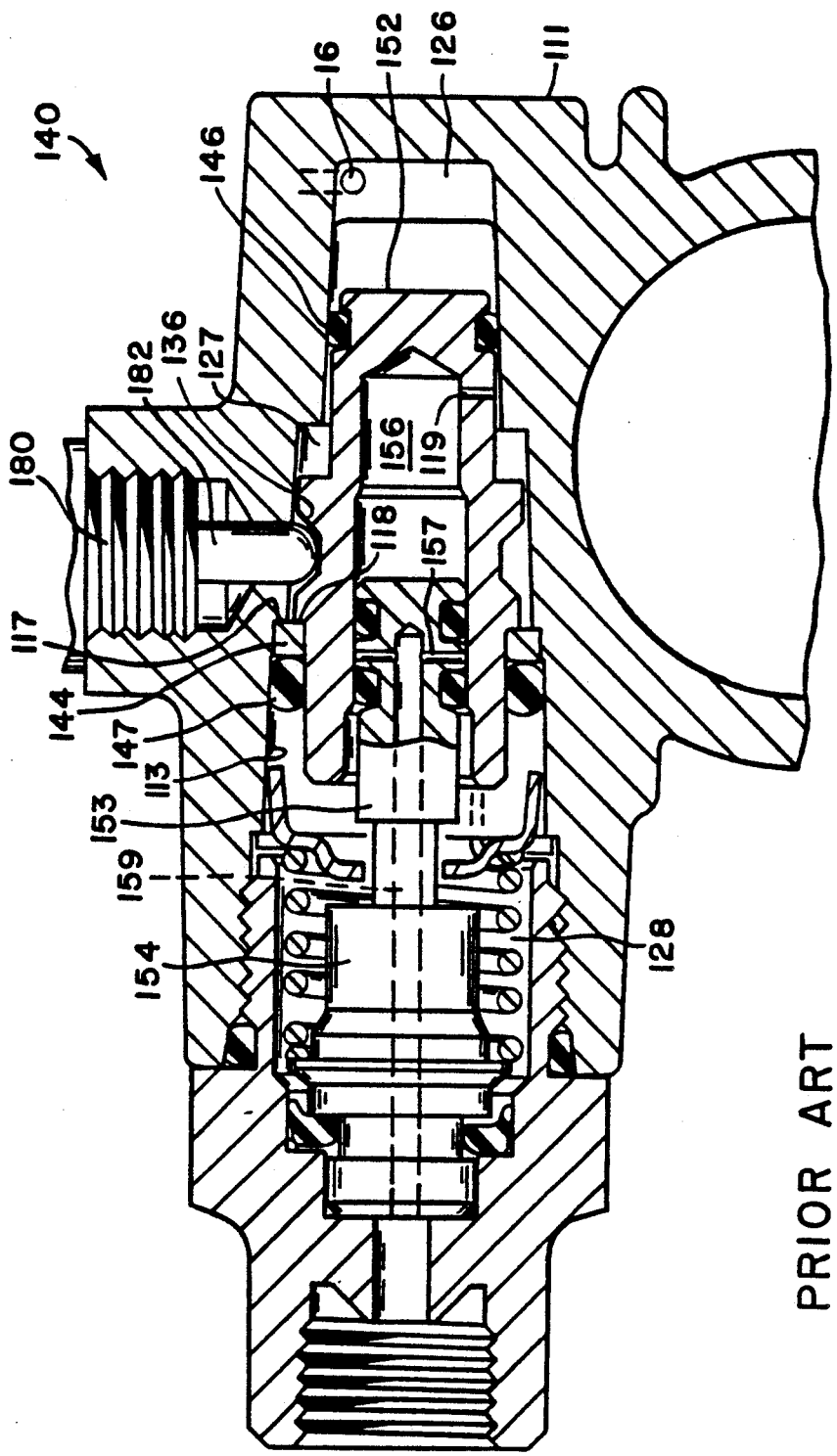
FIG. 1 is an illustration of the proportioning valve/warning switch combination assembly utilizing a prior centering ring.

Referring to FIG. 1, there is illustrated a combination proportioning valve and warning switch assembly which is disclosed in U.S. Pat. No. 4,929,033 and incorporated by reference herein. The housing 111 includes a stepped bore 113 having therein a primary pressure-receiving chamber 126 and a secondary pressure-receiving chamber 128, each communicating respectively with a primary and secondary pressure chamber of an associated master cylinder. Primary pressure receiving chamber 126 communicates with passage 16. The proportioning valve assembly designated by reference numeral 140 comprises a first piston or sleeve part 152 and a second piston part 154. The second piston part 154 has a central longitudinal opening 159 which communicates with radial openings 157. End extension 153 of second piston part 154 is received within the blind bore 156 of first piston or sleeve part 152. First piston or sleeve part 152 includes an orifice 119 which communicates with the vented intermediate chamber 127. Disposed about first piston or sleeve part 152 is a movable seal 146, and at the opposite end of sleeve part 152 is a centering ring 144 and an O-ring type of seal 147. A warning switch 180 includes a probe 182 which is received within the ramped recess 136 of first piston part 152. Because of the differential areas of first piston part 152, the forces acting upon seal 147, centering ring 144 and piston part 152 tend, as a result of the pressure in secondary pressure receiving chamber 128, to be greater than the counteracting forces effected by pressure in primary pressure receiving chamber 126. Thus, piston part 152 is moved to the right toward primary pressure receiving chamber 126 until center ring 144 engages the housing shoulder 117. Centering ring 144 also engages the first piston part shoulder 118. At this "centered" position, probe 182 is in a deactivated position whereby warning switch 180 does not provide any warning signal.

The proportioning valve assembly 140 with through-the-center bypass operates as described within U.S. Pat. No. 4,929,033. An unbalancing of pressures between chambers 126 and 128 causes piston part 152 to move axially in response thereto so that warning switch 180 is actuated. The detection of an excessive pressure differential between chambers 126 and 128 results in the actuation of warning switch mechanism 180. As explained above, the misassembly or failure to include centering ring 144 and/or seal 147 is normally detected by a pressure-leakage method. However, it is theoretically possible that such a misassembly or failure to assemble might not be detected. Thus, it is the object of the present invention to provide via the warning switch mechanism 180 a positive indication of the aforedescribed misassembly or failure to assemble the seal and centering ring.

Figure 2:
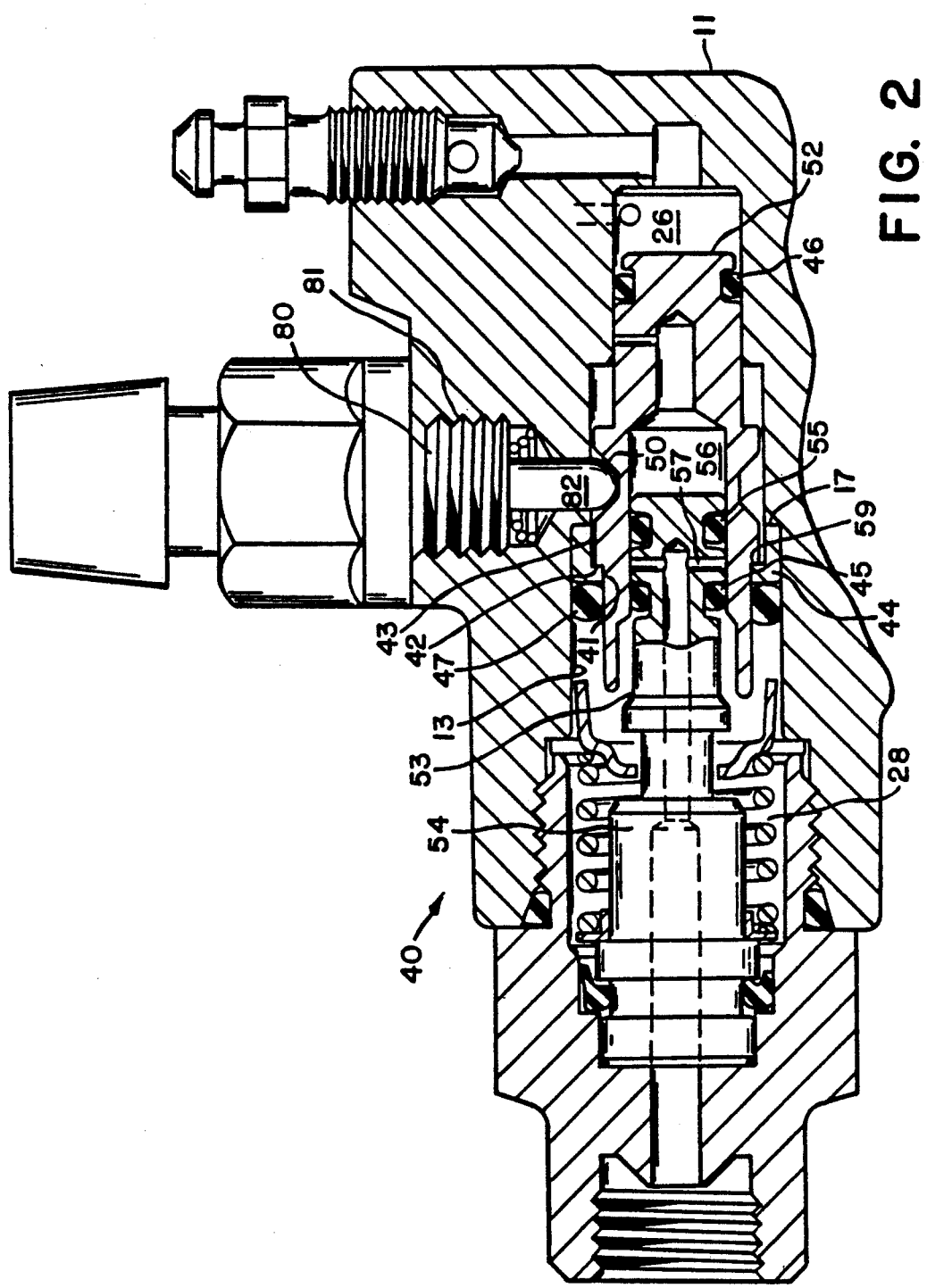
FIG. 2 is an illustration of a proportioning valve/warning switch assembly utilizing the centering ring of the present invention.

Referring to FIG. 2, essentially the same proportioning valve and warning switch combination is illustrated. The hydraulically operated and responsive warning device 80 is received within an opening 81 of housing 11 so that a probe or movable means 82 extends into the stepped bore 13. The stepped bore 13 of housing 11 receives the proportioning valve indicated generally by reference numeral 40, which includes a first piston part or pressure movable sleeve means 52. Sleeve means 52 includes a positioned sleeve portion 50 which is engageable by movable means 82. Sleeve means 52 includes at one end a seal 46 adjacent to the first pressure chamber 26 and a seal 47 at the opposite end adjacent to the second pressure chamber 28. The second piston part 54 includes an extension 53 which extends into the blind bore 56 of sleeve means or first piston part 52. Extension 53 includes radial openings 57 disposed between seals 45 and 55. Proportioning valve 40 operates in the same manner as disclosed in U.S. Pat. No. 4,929,033. Sleeve means 52 includes a sleeve shoulder 59 which normally is not in alignment with housing shoulder 17. This nonalignment is effected by means of the stepped positioning ring 44 which engages at one end the housing shoulder 17 and at the other end sleeve shoulder 59. Seal 47 abuts the stepped positioning ring 44. Stepped positioning ring 44 comprises a reduced inner diameter portion 41 and enlarged inner diameter portion 43 separated by a radial shoulder 42. Radial shoulder 42 engages the sleeve shoulder 59 and the enlarged inner diameter portion 43 abuts the housing shoulder 17. Reduced inner diameter portion 41 is abutted by seal 47. Because seal 47 and positioning ring 44 increase the outer diameter of first piston part or sleeve means 52, this increased diameter being larger than the outer diameter of the opposite end of sleeve means 52 subjected to pressure in first chamber 26, forces effected by means of pressure in the secondary pressure chamber tend to move seal 47, positioning ring 44 and sleeve means 52 toward the right in the direction of first chamber 26. This rightward movement continues until the enlarged inner diameter portion 43 of ring 44 engages housing shoulder 17. At this point, positioning ring 44 and seal 47 cease rightward movement which also prevents ring 44 and seal 47 from bearing rightwardly on sleeve means 52. Thus, sleeve means 52 ceases rightward movement because any further movement would be effected by the secondary pressure bearing upon only the outer diameter of sleeve means 52. Sleeve means 52 is in a centered position whereby movable means 82 engages the positioned sleeve portion 50, and thus, hydraulically operated warning device 80 is in an inactive or deactuated mode. Should a pressure failure occur in either the first or second pressure receiving chambers, the pressure movable sleeve means will shift axially in the appropriate direction and effect operation of hydraulically operated warning device 80.

Figure 3:
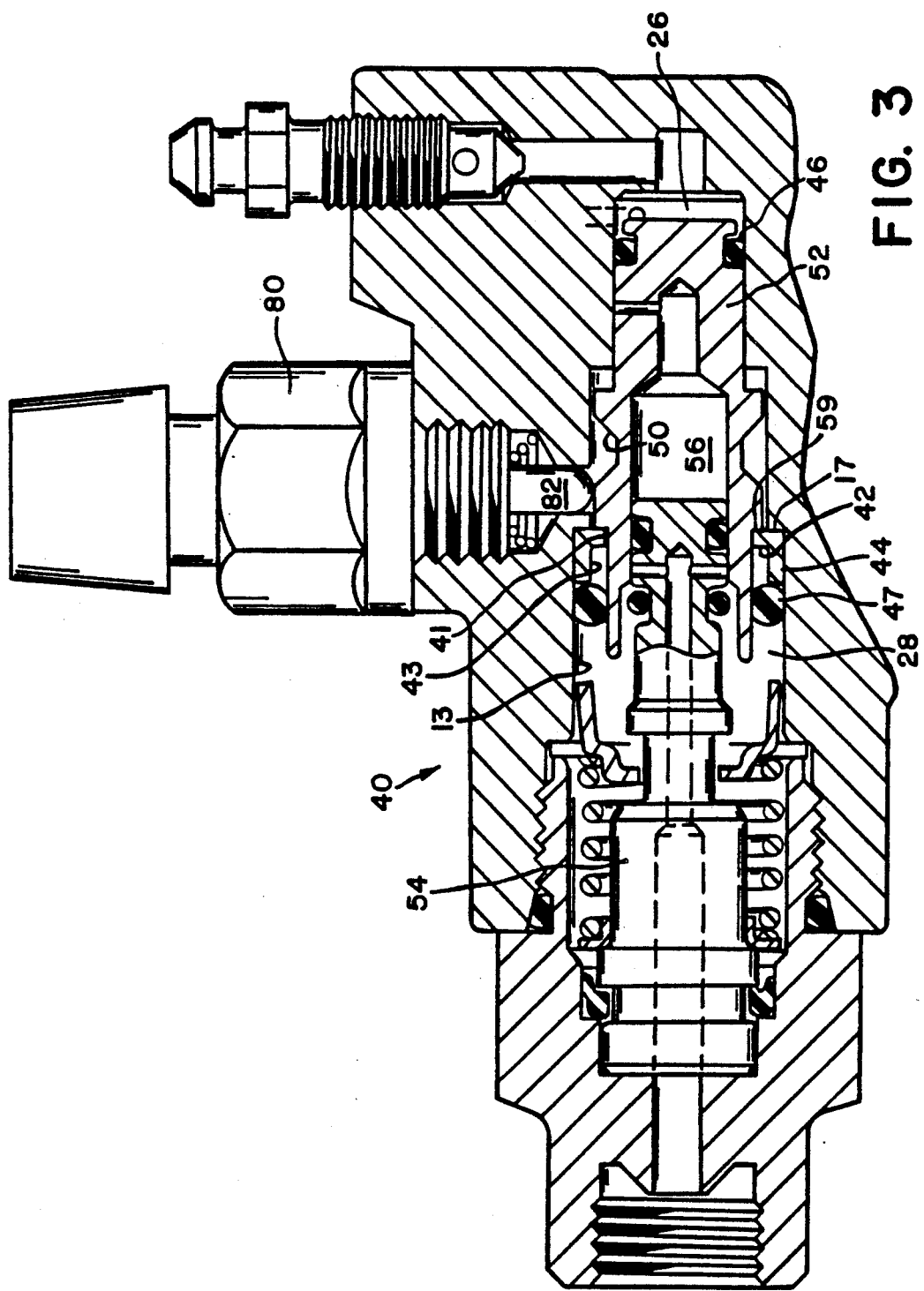
FIG. 3 is an illustration of the assembly of FIG. 2 wherein the centering ring is misassembled.
Figure 4:
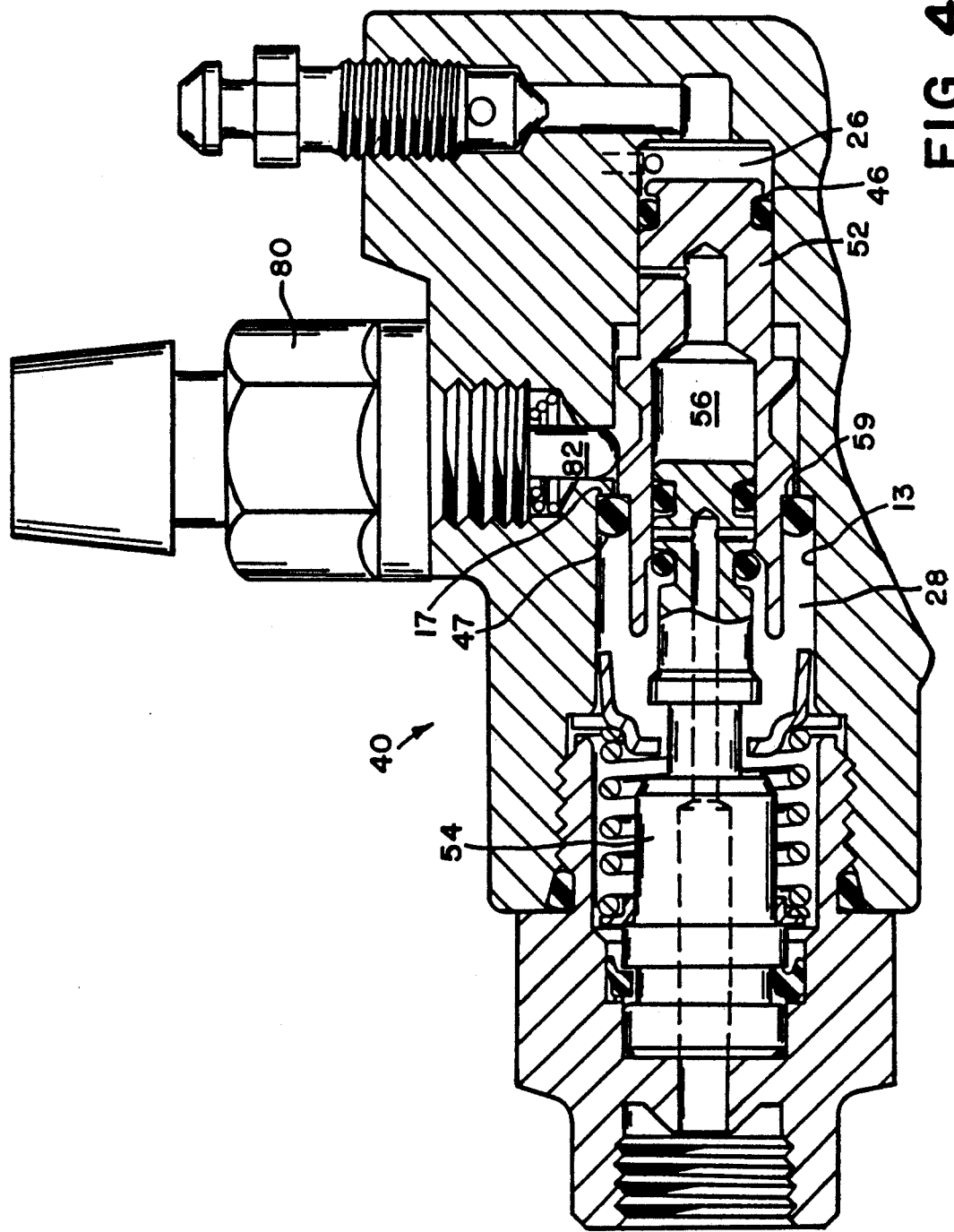
FIG. 4 is an illustration of the assembly of FIG. 2 wherein the centering ring is missing from the assembly.

Referring to FIG. 3, there is illustrated a misassembly of stepped positioning ring 44. Note that positioning ring 44 has reduced inner diameter portion 41 disposed adjacent housing shoulder 17. Because seal 47 and positioning ring 44 increase the outer diameter of movable sleeve 52 which is abutted by positioning ring 44 at sleeve shoulder 59, movable sleeve means 52 is moved further to the right toward primary pressure receiving chamber 26. Movable sleeve means 52 moves further to the right and causes movable means 82 to operate responsively to the lateral displacement of the positioned sleeve portion 50, whereby the hydraulically operated warning device is actuated such that a warning signal is detected during testing and the misassembly of positioning ring 44 is detected. Likewise, should positioning ring 44 fail to be included in the assembly, as illustrated in FIG. 4 where ring 44 is missing, seal 47 will abut sleeve shoulder 59 and result in the movement of seal 47 and sleeve means 52 further toward first pressure receiving chamber 26 than as illustrated in FIG. 2. A warning signal is effected by warning device 80 as a result of movable means 82 operating responsively to the axial movement of positioned sleeve portion 50. Thus, a failure to include the stepped positioning ring 44 within the proportioning valve 40/warning switch 80 assembly results in a positive signal being effected by warning device 80 so that the defect will be detected.

The present invention provides a significant advantage over the prior pressure-leakage method in that detection does not rely any longer upon a pressure or fluid loss. When a misassembly or failure to assemble the stepped positioning ring occurs, the switch contacts of warning device 80 are closed and this signals that an incorrect installation has been made. This improved method of fault detection assures that a correct assembly has been made and that the entire construction will operate appropriately.

We claim:

1. A positioning ring for a hydraulically operated device, the hydraulically operated device comprising a housing having therein a bore communicating with an opening having therein a hydraulically responsive device, pressure movable sleeve means disposed within said bore and having a positioned sleeve portion thereat, the hydraulically responsive device including movable means responsive to the positioned sleeve portion, the sleeve means defining at one end of said bore a portion of a first pressure chamber and at the other end of the bore a portion of a second pressure chamber, the bore including a housing shoulder and the sleeve means including a sleeve shoulder, and stepped positioning ring means disposed about said sleeve means, the stepped positioning ring means engaging the sleeve shoulder and housing shoulder so that the shoulders are nonaligned relative to one another, pressure within the second pressure chamber exerted upon the sleeve means and ring means in a direction toward the first pressure chamber so that said stepped positioning ring means engages said housing shoulder, such that one of a misassembly of said stepped positioning ring means and a failure to place said stepped positioning ring means about said sleeve means permits said sleeve means to be displaced toward said first pressure chamber to cause the movable means to respond to the displacement of the positioned sleeve portion.

2. The positioning ring in accordance with claim 1, wherein the movable means extends from said opening and into the bore.

3. The positioning ring in accordance with claim 1, wherein the hydraulically responsive device comprises a warning switch.

4. The positioning ring in accordance with claim 3, wherein the stepped positioning ring means includes a radial shoulder which engages the sleeve shoulder.

5. The positioning ring in accordance with claim 4, wherein the positioning ring means includes an enlarged diameter portion and a reduced diameter portion separated by said radial shoulder, the enlarged diameter portion extending axially to an end which abuts said housing shoulder.

6. The positioning ring in accordance with claim 5, wherein positioning the reduced diameter portion toward said first pressure chamber results in said sleeve shoulder being moved toward said first pressure chamber and causing responsive movement of the movable means.

7. The positioning ring in accordance with claim 6, wherein said pressure movable sleeve means comprises a piston in a combination proportioning valve and warning switch device.

8. The positioning ring in accordance with claim 7, wherein the porportioning valve includes a piston part slidably received within said piston of the proportioning valve.

9. A positioning ring for a combination proportioning valve and warning switch device, the device comprising a housing having therein a bore communicating with an opening having thereat the warning switch device, piston means disposed within said bore and having a positioned portion thereat, the switch including movable means responsive to the positioned portion, the piston means defining at one end of said bore a portion of a first pressure chamber and at the other end of the bore a portion of a second pressure chamber, the bore including a housing shoulder and the piston means including a piston shoulder, and stepped positioning ring means disposed about said piston means, the stepped positioning ring means engaging the sleeve shoulder and housing shoulder so that the shoulders are nonaligned relative to one another, pressure within the second pressure chamber exerted upon the piston means and ring means in a direction toward the first pressure chamber so that said stepped positioning ring means engages said housing shoulder, such that one of a misassembly of said stepped positioning ring means and a failure to place said stepped positioning ring means about said piston means permits said piston means to be displaced toward said first pressure chamber to cause the movable means to respond to the displacement of the positioned portion.

10. The positioning ring in accordance with claim 9, wherein the movable means extends from said opening and into the bore.

11. The positioning ring in accordance with claim 9, wherein the positioned portion comprises an annular recess.

12. The positioning ring in accordance with claim 9, wherein the stepped positioning ring means includes a radial shoulder which engages the piston shoulder.

13. The positioning ring in accordance with claim 9, wherein the positioning ring means includes an enlarged diameter portion and a reduced diameter portion separated by a radial shoulder, the enlarged diameter portion extending axially to an end which abuts said housing shoulder.

14. The positioning ring in accordance with claim 9, wherein said ring means comprises an "L" shaped ring with a long leg thereof disposed parallel to a longitudinal axis of the piston means.

15. The positioning ring in accordance with claim 9, wherein the porportioning valve includes a piston part slidably received within said piston means.

* * * * *